June 11, 1968  H. W. PATTERSON, JR  3,387,643
NUT WITH INTEGRAL SUPPORT ENGAGING ARMS
Filed Dec. 15, 1965
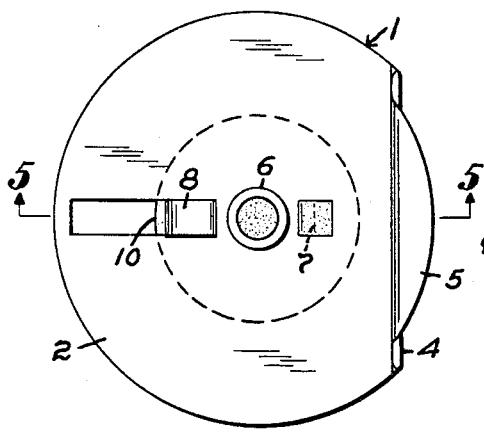
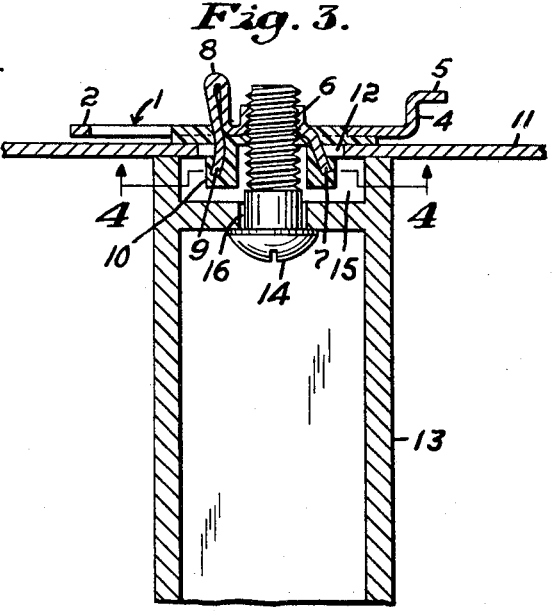
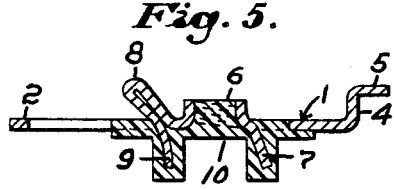
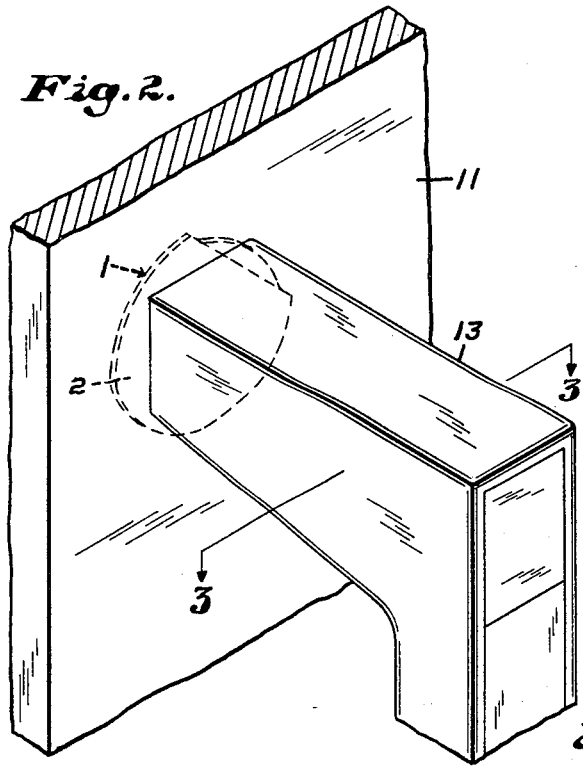
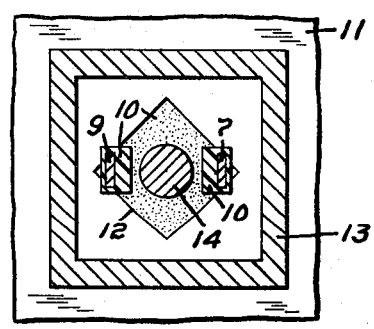
Inventor:
Henry W. Patterson Jr.,
by James R O'Connor
Atty.

United States Patent Office 3,387,643
Patented June 11, 1968

3,387,643
NUT WITH INTEGRAL SUPPORT
ENGAGING ARMS
Henry W. Patterson, Jr., Stow, Mass., assignor to United-Carr Incorporated, Boston, Mass., a corporation of Delaware
Filed Dec. 15, 1965, Ser. No. 513,922
1 Claim. (Cl. 151—41.72)

ABSTRACT OF THE DISCLOSURE

A one-piece nut having integral attaching arms for securing same to an apertured support and means for sealing the opening in said nut and the aperture in said support.

An object of the invention is to provide a simple, inexpensive and highly efficient nut.

Another object of the invention is to provide a nut which is adapted to be attached to an interior surface of the body of an article of manufacture prior to the assembly of the article to permit attachment of hardware to the exterior of the body subsequent to the assembly of the article.

A further object of the invention is to provide a nut for the above recited purpose which is equipped with means to effectively seal the aperture in the body panel both during and subsequent to the assembly of the article of manufacture.

A still further object of the invention is to provide an improved sheet metal nut for attachment of exterior hardware to an article of manufacture which permits the shipping of the article and hardware in an unassembled condition.

Summary of the invention

Invention is seen to reside in a novel nut combination including a base, a threaded, tubular extrusion extending from one surface of the base, a pair of attaching arms extending from the opposite surface of the base, at least one of the arms being joined to the base by a malleable connection whereby said arm may be moved to engage the edge of an aperture in a support and in cooperation with the other arm secure the nut to the support, and a rupturable sealer which covers the opening in the tubular extrusion and encapsulates the support engaging portions of the attaching arms.

Further appreciation of the invention's contribution to the field will become evident from the following detailed description in conjunction with a viewing of the accompanying drawings.

FIG. 1 is a top plan view of the nut;
FIG. 2 is a perspective view of an installation wherein the nut is employed to secure a handle to the exterior of a refrigerator door;
FIG. 3 is a section taken on line 3—3 of FIG. 2;
FIG. 4 is a section taken on line 4—4 of FIG. 3; and
FIG. 5 is a section taken on line 5—5 of FIG. 1.

The nut 1 includes a generally flat, planar base 2 having a circular configuration of something greater than 180°, an upstanding flange 4 having a right angularly bent portion 5 disposed at an edge of the base 2, a threaded, tubular extrusion 6 extending from the base in the same direction as the flange 4 and attaching means sheared from the base and adapted to secure the nut to an apertured workpiece.

The attaching means includes a stationary arm 7 extending from the surface of the base 2 opposite the extrusion 6 outwardly towards the periphery of the base and at an acute angle thereto, and a movable arm including a loop portion 8 extending from the same surface of the base as the extrusion 6 outwardly toward the periphery of the base and a support engaging portion 9 extending from the same surface of the base as the stationary arm 7. The sides of the movable arm forming the loop 8 are generally parallel and portions of same are pressed against one another.

In addition the nut is provided with a flexible, rupturable sealer 10, formed of a synthetic resinous material, which overlies the surface of the base opposite the extrusion 6, covers portions of the openings created by the shearing of the attaching arms and the opening in the threaded extrusion 6, and encapsulates the stationary arm 7 and the workpiece engaging portion 9 of the movable arm.

In FIGS. 2, 3, and 4 the workpiece 11 having an aperture 12 cut therein represents the exterior panel of a refrigerator door which has a handle 13 attached thereto by the nut 1 and a bolt 14.

Prior to the assembly of the door the nut was secured to the back or inside of the panel 11 by passing the arm portions 7 and 9 through the aperture 12, across its corners as shown in FIG. 4, and grasping the loop portion 8 and bent portion 5 of the flange 4 with a pliers and squeezing to cause the loop 8 to rotate upwardly to the position shown in FIG. 3 and the arm 9 to rotate outwardly and act cooperatively with the arm 7 to lock the nut to the panel 11. Thus, the nut is securely fixed to the door panel and the aperture 12 is completely closed by the sealer 10 which is squeezed against the surface of the panel surrounding the aperture. It should also be mentioned that the aperture in the panel might be rectangular in shape with the attaching arms engaged at the shorter edges of the rectangle.

Thereafter the refrigerator door is fully assembled and insulation, generally a poured-in-place urethane foam which is injected under pressure, is installed therein. The prevention of any leakage of the foam insulation through the opening 12 is one of the major functions of the sealer 10, although it later prevents moisture or any other foreign matter from leaking from the outside into the insulation.

Since the nut 1 is installed at the now unavailable side of the refrigerator door panel 11 the unit may be shipped from the manufacturer to the distributor, retailer, and ultimately the consumer without prior attachment of the handle 13. This of course, allows for simpler, more compact packaging and removes the danger of the handle being broken or otherwise damaged in shipment.

Once the unit is unpacked the consumer may readily install the handle by placing same over the opening 11 (note the recess 15 to accommodate the attaching arms 7, 9), passing the bolt 14 through the opening 16 and torquing the bolt into the threaded extrusion 6. Since the sealer 10 is flexible and rupturable it gives way as the bolt is inserted and in no way interferes with the final torquing thereof.

While the improved nut has been described and illustrated in connection with its application as a fastener for a refrigerator door handle it is to be clearly understood that many other uses for the device are, in fact, envisioned. Thus the foregoing description is to be interpreted in an illustrative rather than a limiting sense in that the scope of the invention is best defined by the following claim.

I claim:
1. A sheet metal nut comprising a base portion having a tubular extrusion extending outwardly from one surface thereof, said tubular extrusion having multiple internal threads for engaging a cooperating bolt turned into said extrusion, a stationary arm depending from the surface of said base portion opposite that from which said tubular extrusion extends and extending laterally toward the periphery of said base portion, a movable arm extending from both surfaces of said base portion, said movable arm being spaced laterally from said extrusion and being joined to said base portion by a malleable connection, whereby said movable arm is adapted to be pivotally bent to direct the portion thereof extending from the same surface of said base portion as said stationary arm towards the periphery of said base portion opposite that towards which said stationary arm extends to secure said nut to an apertured support, and a rupturable sealer extending across the opening in said tubular extrusion and encapsulating the support-engaging portions of said arms, the portion of said sealer which overlies said opening depending from the surface of said base a distance appreciably less than the length of said arms, thereby providing a funnel-like lead-in for insertion of a bolt into the end of said extrusion adjacent said base.

References Cited

UNITED STATES PATENTS

| | | | |
|---|---|---|---|
| 3,264,699 | 8/1966 | Knowlton | 85—32 |
| 2,460,722 | 2/1949 | Waara | 85—37 |
| 2,618,998 | 11/1952 | Poupitch. | |
| 2,900,687 | 8/1959 | Cochran. | |
| 2,948,938 | 8/1960 | Holton. | |
| 3,140,958 | 7/1964 | Opotow et al. | 85—32 |
| 3,270,610 | 9/1966 | Knowlton | 85—32 |
| 3,304,980 | 2/1967 | Koehl | 151—41.72 |

MARION PARSONS, Jr., *Primary Examiner.*

CARL W. TOMLIN, *Examiner.*